(12) United States Patent
Gurvich et al.

(10) Patent No.: US 12,209,620 B2
(45) Date of Patent: Jan. 28, 2025

(54) FLEXIBLE COUPLING FOR JOINING METALLIC AND COMPOSITE DRIVE SHAFTS

(71) Applicant: Goodrich Corporation, Charlotte, NC (US)

(72) Inventors: Mark R. Gurvich, Middletown, CT (US); Brayton Reed, New York Mills, NY (US); Michael King, Sauquoit, NY (US); Joyel M. Schaefer, Earlville, NY (US)

(73) Assignee: GOODRICH CORPORATION, Charlotte, NC (US)

( * ) Notice: Subject to any disclaimer, the term of this patent is extended or adjusted under 35 U.S.C. 154(b) by 300 days.

(21) Appl. No.: 17/573,722

(22) Filed: Jan. 12, 2022

(65) Prior Publication Data
US 2023/0220885 A1 Jul. 13, 2023

(51) Int. Cl.
*B64D 35/00* (2006.01)
*F16D 3/06* (2006.01)
(Continued)

(52) U.S. Cl.
CPC ............... *F16D 3/06* (2013.01); *B64D 35/00* (2013.01); *F16D 3/66* (2013.01); *F16D 3/68* (2013.01); *B64C 27/59* (2013.01)

(58) Field of Classification Search
CPC ........... B64D 35/00; B64C 27/59; F16D 3/06; F16D 3/66; F16D 3/68; F16D 3/56; F16D 3/72
(Continued)

(56) References Cited

U.S. PATENT DOCUMENTS

| 1,264,742 A | 4/1918 | Aldrich |
| 1,345,394 A * | 7/1920 | O'Connor ................. F16D 3/56 |
| | | 464/65.1 |

(Continued)

FOREIGN PATENT DOCUMENTS

| AT | 230689 | 12/1963 |
| CN | 201351690 | 11/2009 |

(Continued)

OTHER PUBLICATIONS

European Application No. 22213191.4 filed Dec. 13, 2022; Extended European Search Report dated Apr. 11, 2023; 8 pages.
(Continued)

*Primary Examiner* — Medhat Badawi
*Assistant Examiner* — Vicente Rodriguez
(74) *Attorney, Agent, or Firm* — CANTOR COLBURN LLP (57) ABSTRACT

A flexible coupling includes a first flange having an outer edge, a first surface, a second surface opposite the first surface, and a first plurality of passages. A second flange including an outer edge section, a first surface section, a second surface section opposite the first surface section, and a second plurality of passages. A connecting element extends between and connecting the first flange and the second flange through one of the first plurality of passages and one of the second plurality passages. The connecting element includes a connecting member having a first stop element and a second stop element. A compliant component is arranged on the connecting element. The compliant component is positioned on the connecting member between one of: the first stop element and the first surface; the second stop element and the second surface section; and between the second surface and the first surface section.

12 Claims, 10 Drawing Sheets

(51) Int. Cl.
*F16D 3/66* (2006.01)
*F16D 3/68* (2006.01)
*B64C 27/59* (2006.01)

(58) Field of Classification Search
USPC ........................ 464/65.1, 137, 169
See application file for complete search history.

(56) References Cited

U.S. PATENT DOCUMENTS

| | | | | |
|---|---|---|---|---|
| 1,491,761 A | * | 4/1924 | Smith | ............... F16D 3/56 |
| | | | | 464/65.1 |
| 1,586,250 A | | 5/1926 | Lane | |
| 1,783,158 A | * | 11/1930 | Eckart | ............... F16D 3/56 |
| | | | | 464/65.1 |
| 2,453,383 A | * | 11/1948 | Rathman | ............... F16D 3/70 |
| | | | | 464/65.1 |
| 4,055,966 A | | 11/1977 | Fredericks | |
| 4,318,281 A | * | 3/1982 | Cutler | ............... F16D 3/78 |
| | | | | 29/423 |
| 4,416,645 A | * | 11/1983 | Fredericks | ............... F16D 3/79 |
| | | | | 464/99 |
| 4,639,237 A | | 1/1987 | Fukuda | |
| 6,158,530 A | * | 12/2000 | Bowen | ............... A24F 13/00 |
| | | | | 131/201 |
| 7,402,108 B2 | | 7/2008 | Miyakawa et al. | |
| 10,648,501 B2 | | 5/2020 | Iyer et al. | |
| 2018/0086444 A1 | * | 3/2018 | Poster | ............... F16H 1/28 |

FOREIGN PATENT DOCUMENTS

| | | |
|---|---|---|
| DE | 2928851 | 4/1980 |
| DE | 102013226053 A1 | 6/2015 |
| EP | 0567351 A1 | 10/1993 |
| GB | 556300 | 9/1943 |
| GB | 2030268 | 4/1980 |

OTHER PUBLICATIONS

European EPO Official Letter for Application No. 22213191.4, mailed Jun. 26, 2024, 4 pages.

* cited by examiner

FLEXIBLE COUPLING FOR JOINING METALLIC AND COMPOSITE DRIVE SHAFTS

BACKGROUND

Exemplary embodiments pertain to the art of mechanical systems and, more particularly, to a flexible coupling for joining metallic and/or composite drive shafts.

Couplings are used to join drive shafts, and the shafts are designed to be able to transfer torque and to have little to no inherent bending and/or axial flexibility. However, often times, shafts may be installed slightly off-axis relative to one another or, during operation, may generate off-axis axial or bending movements. Thus, the couplers represent a flexible joint that can transfer significant torsional load and, at the same time, can accommodate bending and/or axial motion between two shafts or between a shaft and either a drive member (e.g., engine) or driven member (e.g., rotor blade system). Current couplings typically include components that having complex shapes that are machined and welded with a high geometrical tolerance and/or require high-quality fabrication criteria (e.g., for welding) making them expensive and labor-intensive. Therefore, alternative less expensive designs of diaphragms without requirements of exceptional geometrical tolerance and/or welding are needed.

BRIEF DESCRIPTION

Disclosed in accordance with a non-limiting example is a flexible coupling including a first flange having a first body including an outer edge, a first surface, a second surface opposite the first surface, and a first plurality of passages that extend through the first body inwardly of the outer edge. A second flange including a second body having an outer edge section, a first surface section, a second surface section opposite the first surface section, and a second plurality of passages that extend through the second body inwardly of the outer edge. A connecting element extends between and connecting the first flange and the second flange through one of the first plurality of passages and one of the second plurality passages. The connecting element includes a connecting member having a first end provided with a first stop element, a second end having a second stop element, and an intermediate portion extending between the first end and the second end. A compliant component is arranged on the connecting element. The compliant component is positioned on the connecting member between one of: the first stop element and the first surface; the second stop element and the second surface section; and between the second surface and the first surface section.

Additionally, or alternatively, in this or other non-limiting examples, the compliant component comprises a spring.

Additionally, or alternatively, in this or other non-limiting examples, the compliant component comprises one of an elastomeric and a polymeric bushing.

Additionally, or alternatively, in this or other non-limiting examples, each of the first plurality of passages includes an annular wall having a curvilinear surface.

Additionally, or alternatively, in this or other non-limiting examples, each of the first plurality of passages includes an annular wall having a first taper at the first surface and a second taper at the second surface.

Additionally, or alternatively, in this or other non-limiting examples, the compliant component includes a first compliant component arranged between the first stop element and the first surface and a second compliant component arranged between the second stop element and the second surface section.

Additionally, or alternatively, in this or other non-limiting examples, the compliant component includes a third compliant component arranged between the second surface and the first surface section.

Additionally, or alternatively, in this or other non-limiting examples, a compliant element arranged between the second surface section and the third surface section inwardly of the connecting member.

Additionally, or alternatively, in this or other non-limiting examples, the compliant component includes a first compliant component arranged between the second surface and the first surface section and a second compliant component arranged between the second stop element and the second surface section.

Additionally, or alternatively, in this or other non-limiting examples, a shaft portion including an outer surface and an inner surface defining a tube the shaft portion being formed from one of a metal material, a composite material, and a hybrid metal/composite material and connected to the second flange.

Also disclosed in accordance with a non-limiting example is an aircraft including a fuselage, a drive system supported by the fuselage, a driven system supported by the fuselage, and a flexible coupling connecting the drive system and the driven system. The flexible coupling includes a first flange operatively connected to the drive system. The first flange includes a first body having an outer edge, a first surface, a second surface opposite the first surface, and a first plurality of passages that extend through the first body inwardly of the outer edge. A second flange is operatively connected to the driven system. The second flange includes a second body having an outer edge section, a first surface section, a second surface section opposite the first surface section, and a second plurality of passages that extend through the second body inwardly of the outer edge. A connecting element extends between and connecting the first flange and the second flange through one of the first plurality of passages and one of the second plurality passages. The connecting element includes a connecting member having a first end provided with a first stop element, a second end having a second stop element, and an intermediate portion extending between the first end and the second end. A compliant component is arranged on the connecting element. The compliant component is positioned on the connecting member between one of the first stop element and the first surface, the second stop element and the second surface section, and between the second surface and the first surface section.

Additionally, or alternatively, in this or other non-limiting examples, the compliant component comprises a spring.

Additionally, or alternatively, in this or other non-limiting examples, the compliant component comprises one of an elastomeric and a polymeric bushing.

Additionally, or alternatively, in this or other non-limiting examples, each of the first plurality of passages includes an annular wall having a curvilinear surface.

Additionally, or alternatively, in this or other non-limiting examples, each of the first plurality of passages includes an annular wall including a first taper at the first surface and a second taper at the second surface.

Additionally, or alternatively, in this or other non-limiting examples, the compliant component includes a first compliant component arranged between the first stop element and the first surface and a second compliant component arranged between the second stop element and the second surface section.

Additionally, or alternatively, in this or other non-limiting examples, the compliant component includes a third compliant component arranged between the second surface and the first surface section.

Additionally, or alternatively, in this or other non-limiting examples, the compliant component includes a first compliant component arranged between the second surface and the first surface section and a second compliant component arranged between the second stop element and the second surface section.

Additionally, or alternatively, in this or other non-limiting examples, a shaft portion including an outer surface and an inner surface defining a tube, the shaft portion being formed from one of a metal material, a composite material, and hybrid metal/composite material and connected to the second flange.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
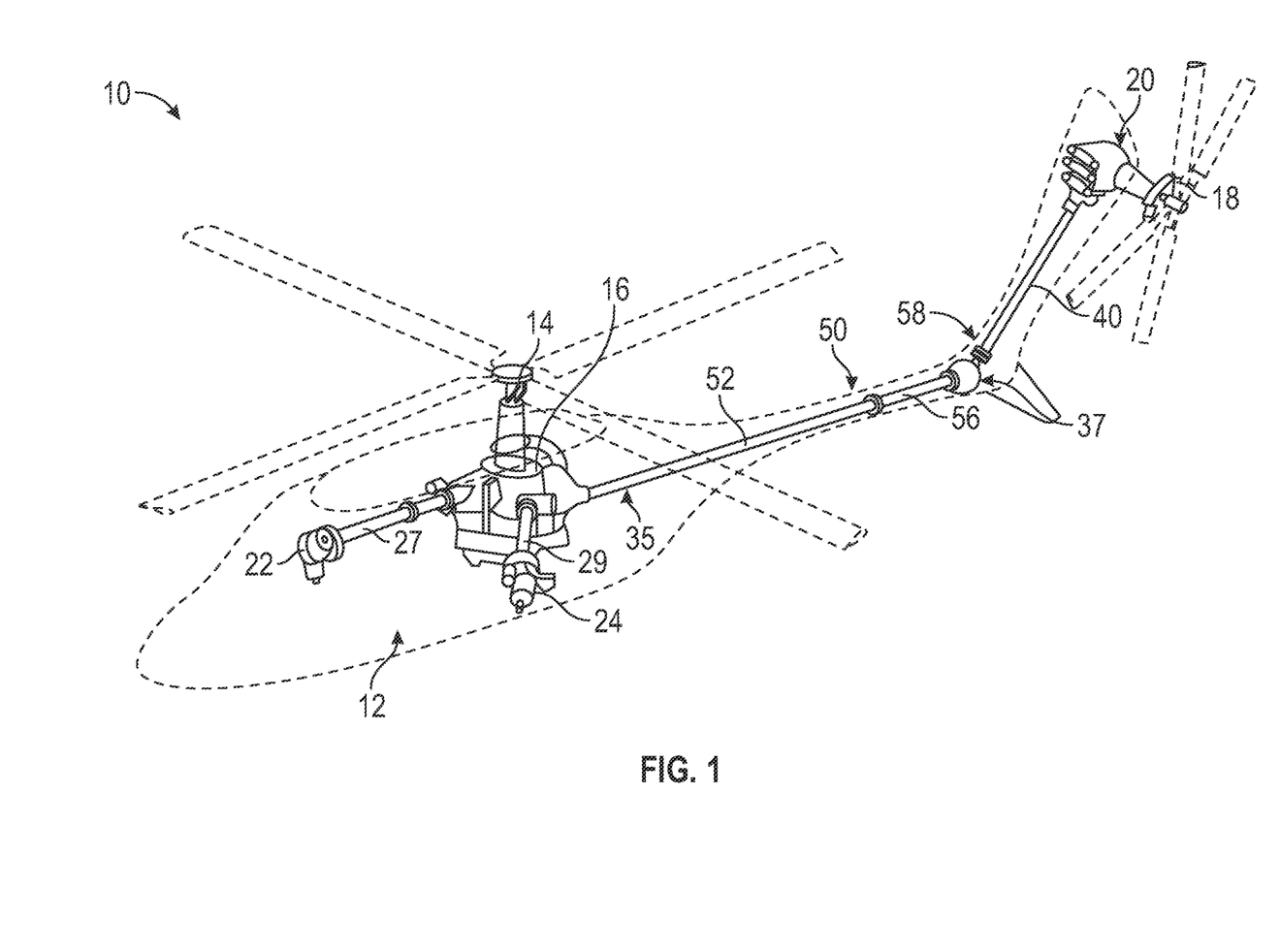
FIG. 1 depicts an aircraft, in the form of a rotary wing aircraft, including a drive system, drive shafts and flexible couplings, in accordance with a non-limiting example.

An aircraft, shown in the form of a rotary wing aircraft, is indicated generally at 10 in FIG. 1 in accordance with a non-limiting example. Aircraft 10 includes a fuselage 12 supporting a first driven system or main rotor 14 coupled to a gearbox 16. A second driven system or tail rotor 18 is connected to a tail rotor gearbox 20. A first drive system, shown as a first engine 22 and a second drive system, shown as second engine 24 are connected to gearbox 16 through a first shaft 27 and a second shaft 29 respectively. A third shaft 35 extends from gearbox 16 toward tail rotor 18. Tail rotor gearbox 20 is connected to a tail rotor gear 37 through fourth shaft 40. Tail rotor gear 37 creates a directional change between third shaft 35 and fourth shaft 40. In a non-limiting example, third shaft 35 may be formed from a metal material. In another non-limiting example, third shaft 35 may be formed from a composite material. In other non-limiting examples, third shaft 35 can be a hybrid, i.e., formed from both metallic and composite components.

In a non-limiting example, third shaft 35 supports a flexible coupling 50. Third shaft 35 includes a first shaft portion 52 that extends from first drive system 22 and second drive system 24 via gearbox 16 and a second shaft portion 56 that connects with tail rotor gear 37. In a non-limiting example, flexible coupling 50 connects first shaft portion 52 with second shaft portion 56. Flexible coupling 50 may absorb axial and lateral deviations between first shaft portion 52 and second shaft portion 56 along an axis defined by third shaft 35. Another flexible coupling 58 may be employed to connect fourth shaft 40 with tail rotor gear 37. Additional flexible couplings (not separately labeled) may be employed in connection with first shaft 27 and second shaft 29.

Reference will now follow to FIGS. 2-5, in describing flexible coupling 50 with an understanding that flexible coupling 58 can include similar structure. Flexible coupling 50 includes a first flange 60 mechanically and flexibly connected to a second flange 62. First flange 60 includes a first body 65 having an outer edge 67 which, in the non-limiting example shown, is annular. First body 65 includes a first surface 70 and a second surface 72. A first plurality of openings, one of which is indicated at 74 extends through first body 65 radially inwardly of outer edge 67. Second flange 62 includes a second body 78 having an outer edge section 80 which, in the non-limiting example shown, is annular. Second body 78 includes a first surface section 82 and a second surface section 84. A second plurality of openings, one of which is indicated at 86 extends through first body 65 radially inwardly of outer edge 67.

Figure 2:
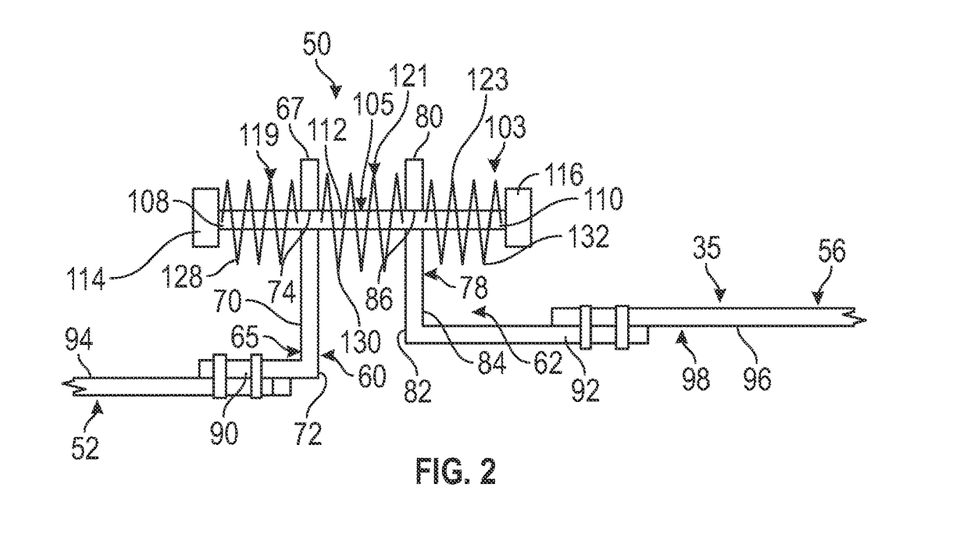
FIG. 2 is a partial axial cross-sectional schematic side view of the coupling of FIG. 1 having three compliant components supported by a connecting member, in accordance with a non-limiting example.

In a non-limiting example, first flange 60 includes a first mounting section 90 projecting axially outwardly of first surface 70. Second flange 62 includes a second mounting section 92 that projects axially outwardly from second surface section 84. First mounting section 90 is connected to an outer surface 94 of first shaft portion 52. Second mounting section 92 connects with an inner surface 96 of second shaft portion 56. In a non-limiting example, second shaft portion 56 takes the form of a tube 98.

Figure 3:
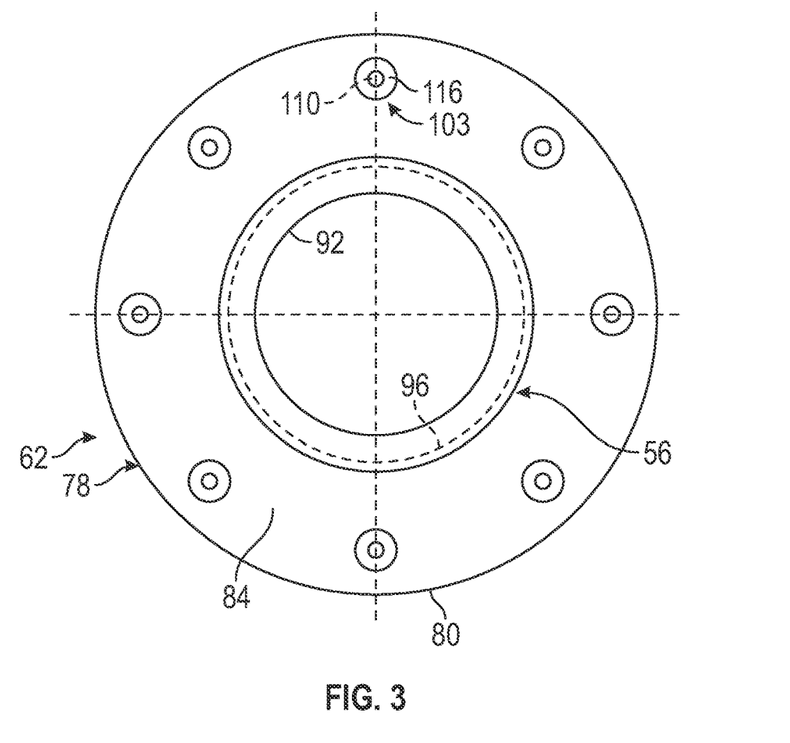
FIG. 3 depicts a diametric end view of the coupling of FIG. 2, in accordance with a non-limiting example.

In a non-limiting example, a connecting element 103 extends through each of the first plurality of passages 74 and second plurality of passages 86 flexibly linking first flange 60 and second flange 62 as shown in FIG. 2 as an axial partial cross-sectional view and in FIG. 3 as a diametric view. Connecting elements 103 transmit torque between first flange 60 and second flange 62. Connecting element 103 includes a connecting member 105 having a first end 108, a second end 110, and an intermediate portion 112 extending between first end 108 and second end 110. A first stop element 114 is arranged at first end 108. A second stop element 116 is arranged at second end 110. First and second stop elements 114 and 116 may be fixedly attached to connecting member 105 in one non-limiting example. In another non-limiting example, one, another, or both of first stop element 114 and second stop element 116 is detachably mounted to connecting member 105.

In a non-limiting example, connecting element 103 supports one or more compliant components. Referring to FIG. 2, a first compliant component 119 is positioned on connecting member 105 between first stop element 114 and first surface 70, a second compliant component 121 is positioned on connecting member 105 between second surface 72 and first surface section 82, and a third compliant component arranged between second surface section 84 and second stop element 116. In a non-limiting example, first compliant component 119 may take the form of a first coil spring 128, second compliant component 121 may take the form of a second coil spring 130, and third compliant component 123 may take the form of a third coil spring 132. In other embodiments, compliant components can be designed as any combination of coil helical, conical, disk or Belleville, and machined springs.

Figure 4:
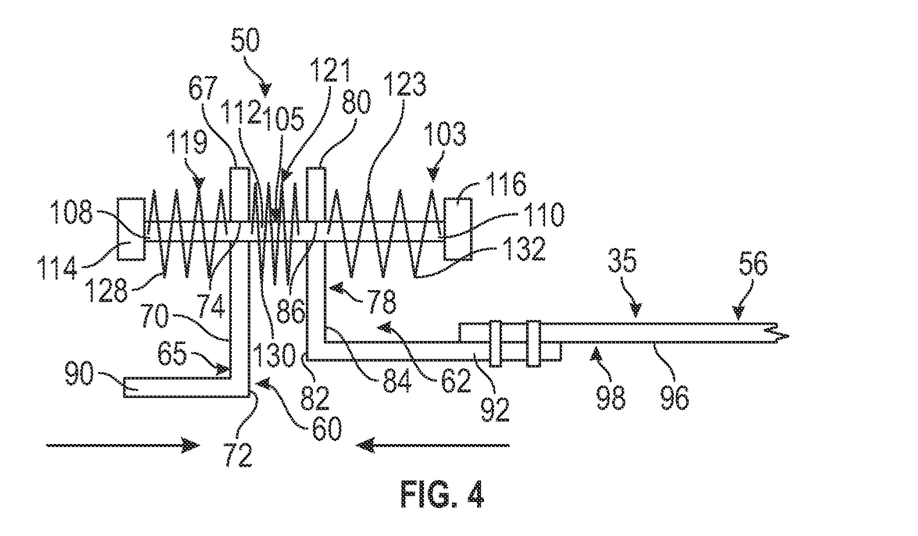
FIG. 4 depicts a partial axial cross-sectional schematic side view of the coupling of FIG. 2 in compression between first and second flanges, in accordance with a non-limiting example.
Figure 5:
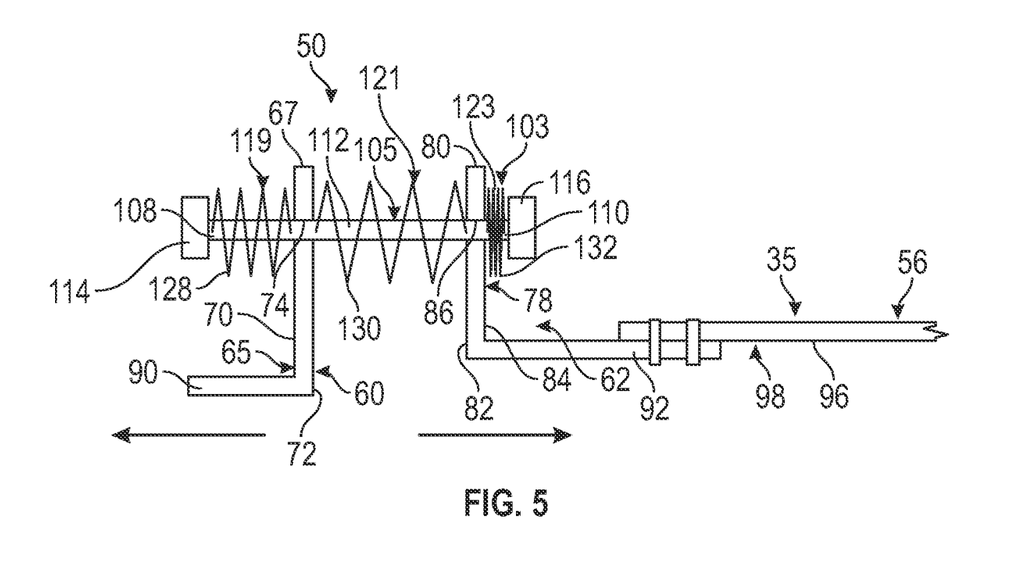
FIG. 5 depicts a partial axial cross-sectional schematic side view of the coupling of FIG. 2 in tension between first and second flanges, in accordance with a non-limiting example.

In a non-limiting example, first, second, and third compliant components 119, 121, and 123 react to service conditions that are aligned with third shaft 35 or displacements due to axial or bending misalignments such as compression as shown in FIG. 4 and tension as shown in FIG. 5. First, second, and third compliant components 119, 121, and 123 may also react to conditions that may result in excursions of first shaft portion 52 and/or second shaft portion 56 from the axis defined by third shaft 35 or "off-torsional" displacements. Under compression, first compliant component 119 and second compliant component 121 may be compressed while third compliant component 123 may be stretched. Under tension, first compliant component 119 and second compliant component 121 may be stretched and third compliant component 123 may be stretched. In this manner, not only does flexible coupling 58 transmit torque along third shaft 35 but also supports changes in axial and/or bending displacements due to operating conditions.

Figure 6:
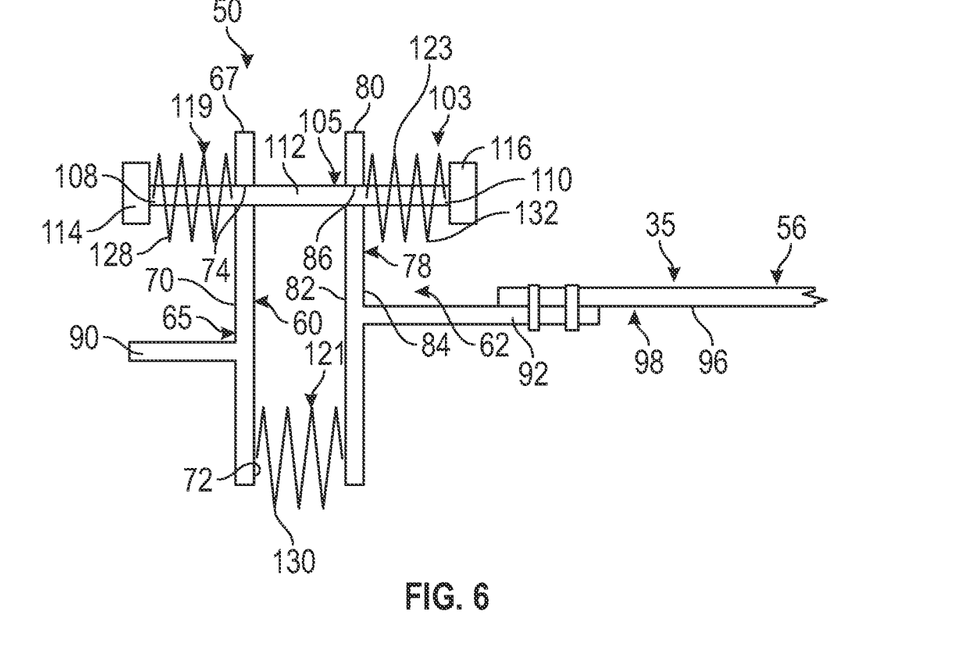
FIG. 6 depicts a partial axial cross-sectional schematic side view of the coupling of FIG. 1, having two compliant components supported by a connecting member and a compliant element, in accordance with a non-limiting example.

In accordance with a non-limiting example depicted in FIG. 6, second compliant component 121 may be moved from connecting member 105 radially inwardly. In the exemplary embodiment shown, second compliant component 121 is directly connected between second surface 72 and first surface section 82 radially inwardly of first mounting section 90 and second mounting section 92.

Figure 7:
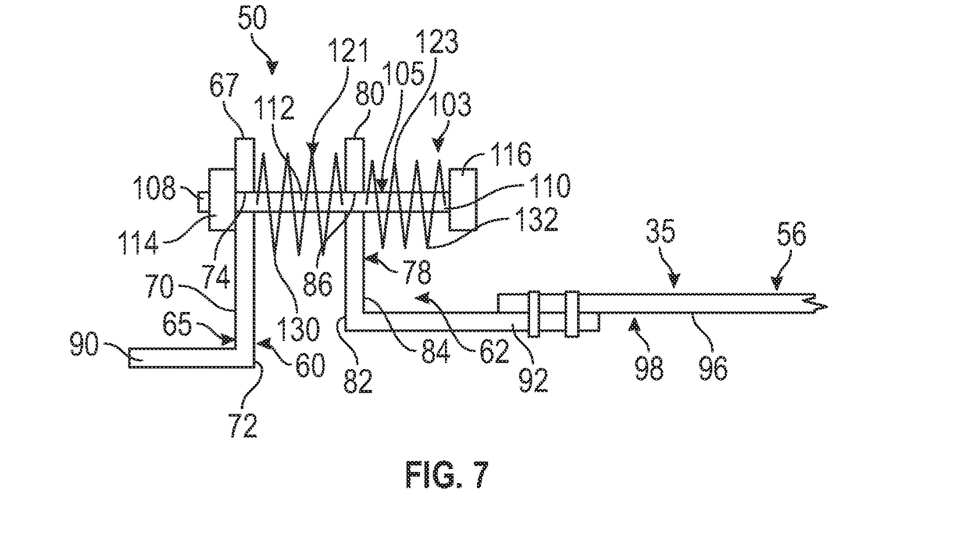
FIG. 7 depicts a partial axial cross-sectional schematic side view of the coupling of FIG. 1, including two compliant components supported by a connecting member, in accordance with yet another non-limiting example.
Figure 8:
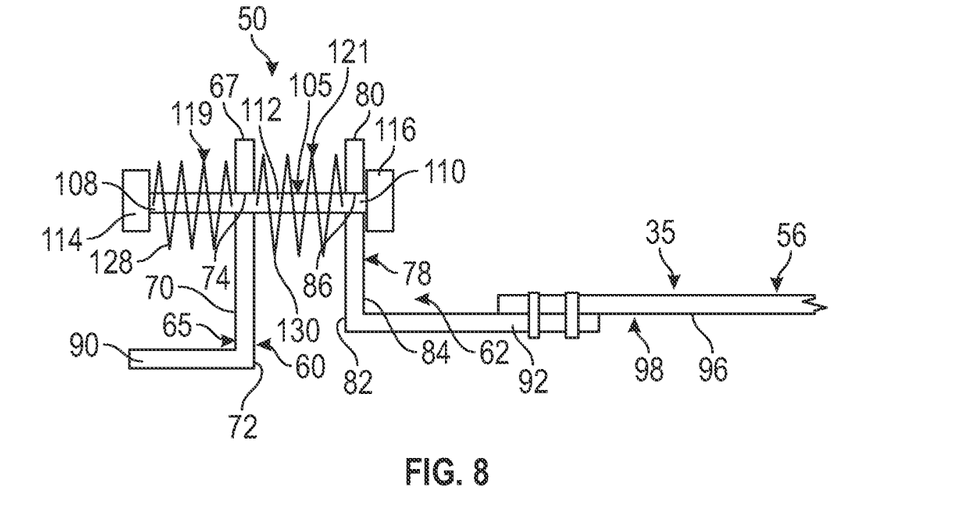
FIG. 8 depicts a partial axial cross-sectional schematic side view of the coupling of FIG. 1, including two compliant components supported by a connecting member, in accordance with still another non-limiting example.
Figure 9:
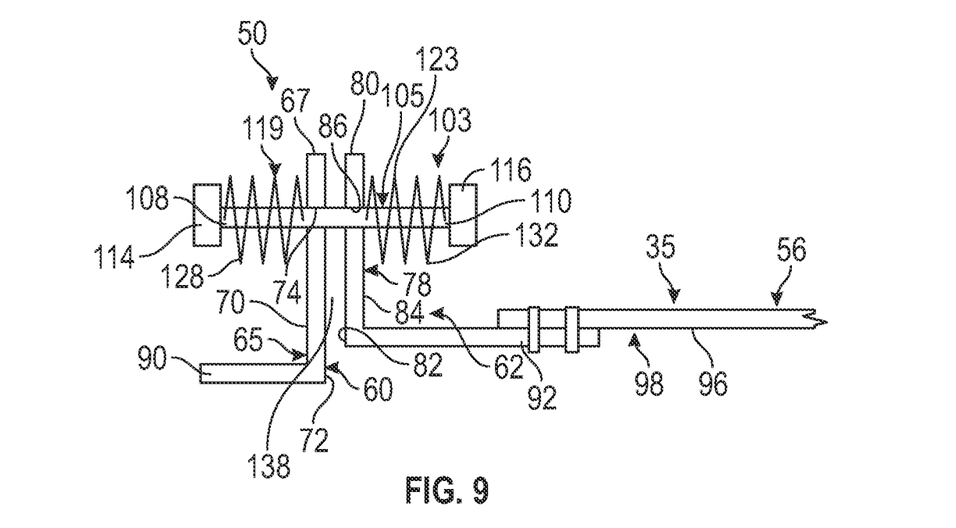
FIG. 9 depicts a partial axial cross-sectional schematic side view of the coupling of FIG. 1, including two compliant components supported by a connecting member, in accordance with yet still another non-limiting example.

FIGS. 7-9 depict non-limiting examples in which only two compliant components are employed. In FIG. 7, first compliant component 119 is omitted. In FIG. 8, third compliant component 123 is omitted. In each case, when subjected to compression, second compliant component 121 is compressed and third compliant component 123 (FIG. 7) is stretched or first compliant component 119 (FIG. 8) is stretched. In tension, second compliant component 121 is stretched and either third compliant component 123 (FIG. 7) is compressed or first compliant component 119 (FIG. 8) is compressed. In FIG. 9, second compliant component 121 is omitted and a gap 138 is maintained between first flange 60 and second flange 62 to accommodate movement of first shaft portion 52 relative to second shaft portion 56. In a non-limiting example, first compliant component 119 is connected to each of first stop element 114 and first surface 70. That is, each end (not separately labeled) of first compliant component 119 is fixedly connected to corresponding ones of first stop element 114 and first surface 70. Similarly, third compliant component 123 connected to second stop element 116 and to second surface section 84. That is, each end (not separately labeled) of third compliant component 123 is fixedly connected to corresponding ones of second stop element 116 and second surface section 84.

Figure 10:
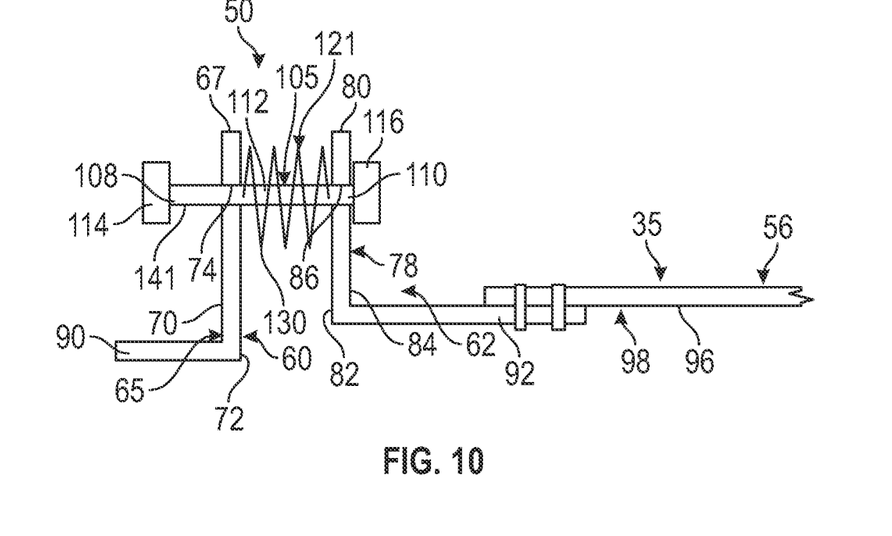
FIG. 10 depicts a partial axial cross-sectional schematic side view of the coupling of FIG. 1 including a single compliant component supported by a connecting member, in accordance with another non-limiting example.
Figure 11:
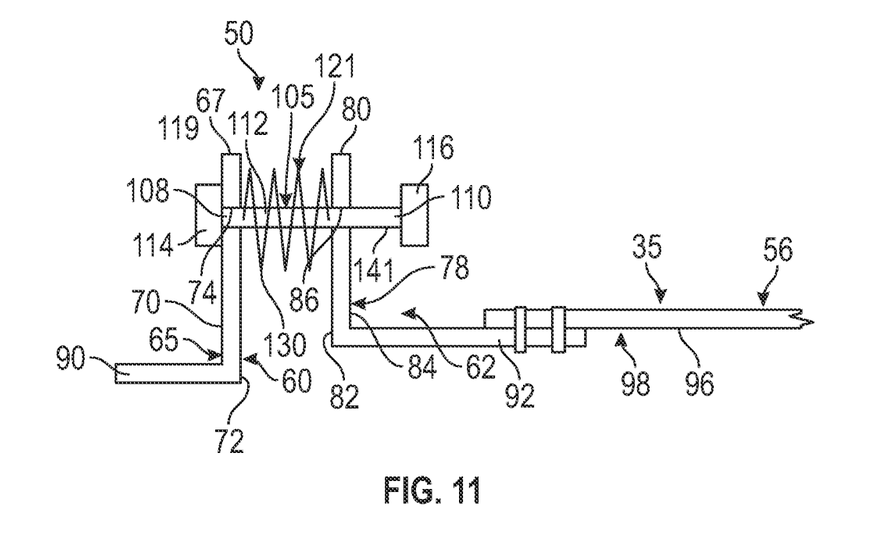
FIG. 11 depicts a partial axial cross-sectional schematic side view of the coupling of FIG. 1 including a single compliant component supported by a connecting member, in accordance with still another non-limiting example.
Figure 12:
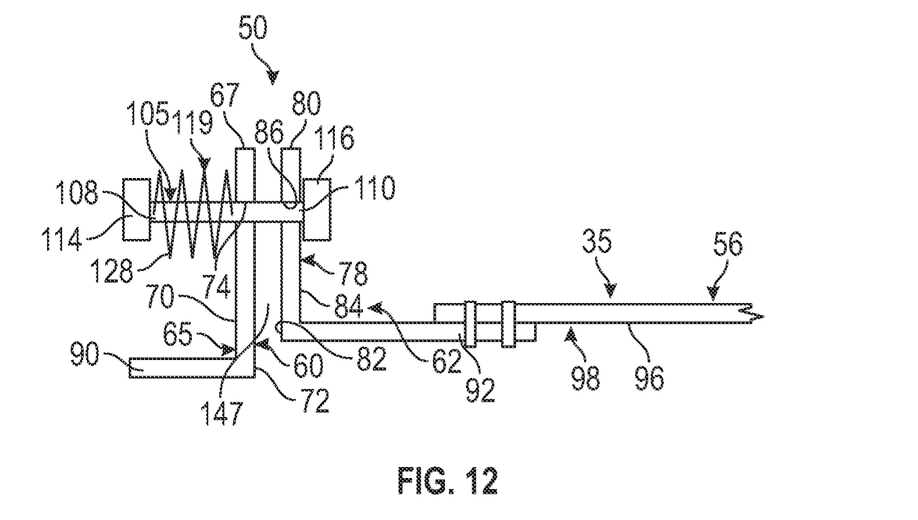
FIG. 12 depicts a partial axial cross-sectional schematic side view of the coupling of FIG. 1 including a single compliant component supported by a connecting member, in accordance with yet another non-limiting example.
Figure 13:
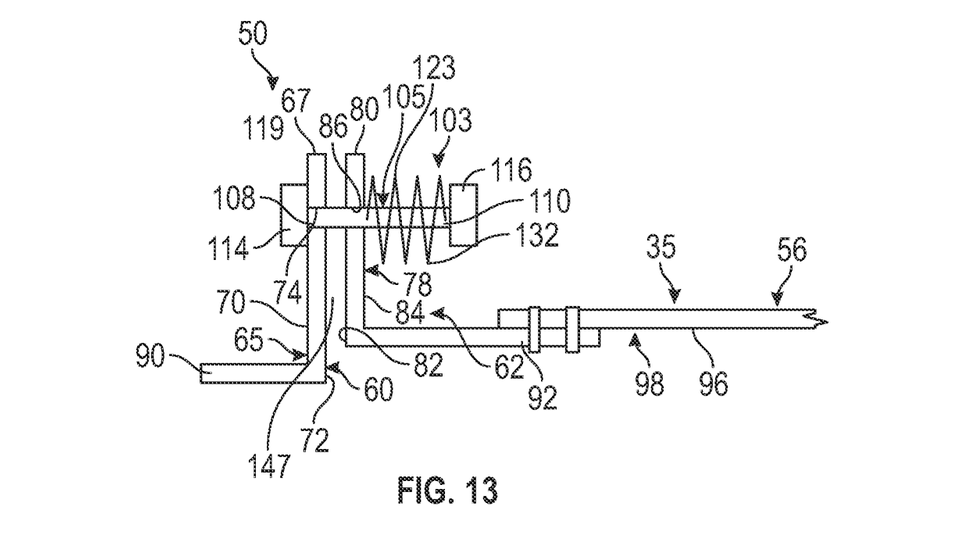
FIG. 13 depicts a partial axial cross-sectional schematic side view of the coupling of FIG. 1 including a single compliant component supported by a connecting member, in accordance with yet still another non-limiting example.

FIGS. 10-13 depict non-limiting examples in which only a single compliant component is employed. In FIG. 10, second compliant component 121 is disposed between first flange 60 and second flange 62, i.e., between the second surface 72 and the first surface sections 82. A gap 141 is maintained between first stop element 114 and first surface 70 by connecting ends of the compliant component to second section 72 and the first surface section 82, accordingly. It should be understood that gap 141 could, in accordance with another non-limiting example, be similarly arranged between second surface section 84 and second stop element 116 as shown in FIG. 11. In accordance with another non-limiting example, second compliant component 121 and third compliant component 123 may be omitted as shown in FIG. 12. A gap 147 is maintained between second surface 72 and first surface section 82 to allow for relative movement. In accordance with another non-limiting example shown in FIG. 13, first compliant component 119 and second compliant component 121 may be omitted with gap 147 being maintained between second surface 72 and first surface section 82.

Figure 14:
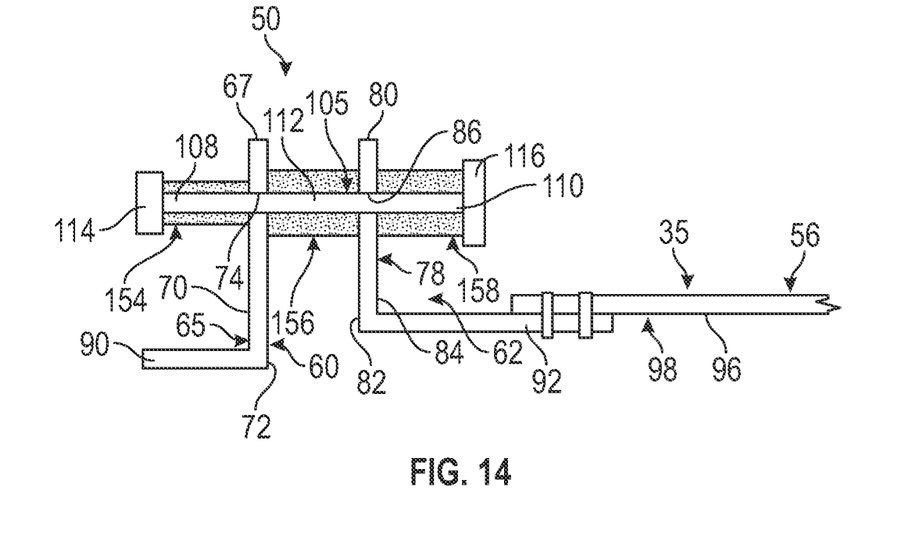
FIG. 14 depicts a partial axial cross-sectional schematic side view of the coupling of FIG. 1 having compliant components in the form of a resilient elastomeric bushings, in accordance with another non-limiting example.
Figure 15:
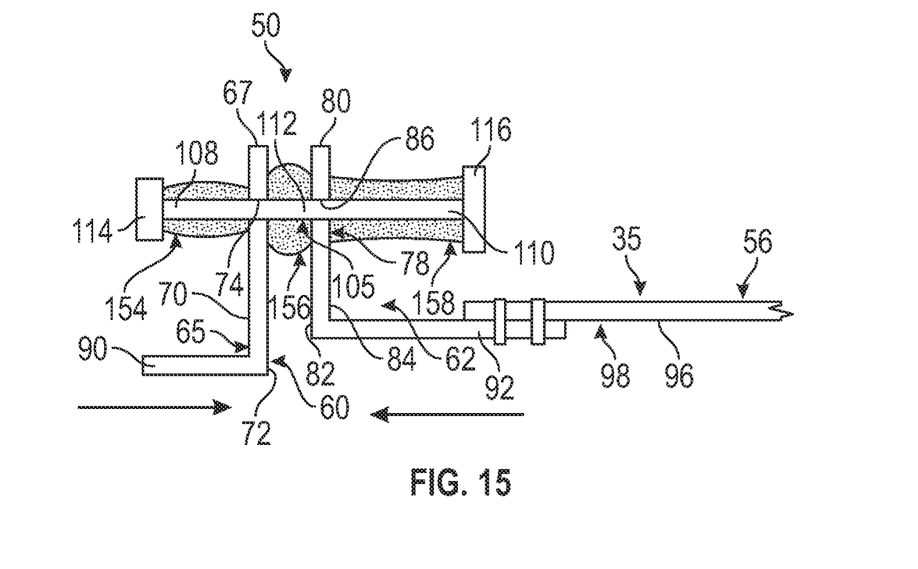
FIG. 15 depicts a partial axial cross-sectional schematic side view of the coupling of FIG. 14 having compliant components in the form of a resilient elastomeric bushings in compression between first and second flanges, in accordance with yet another non-limiting example.
Figure 16:
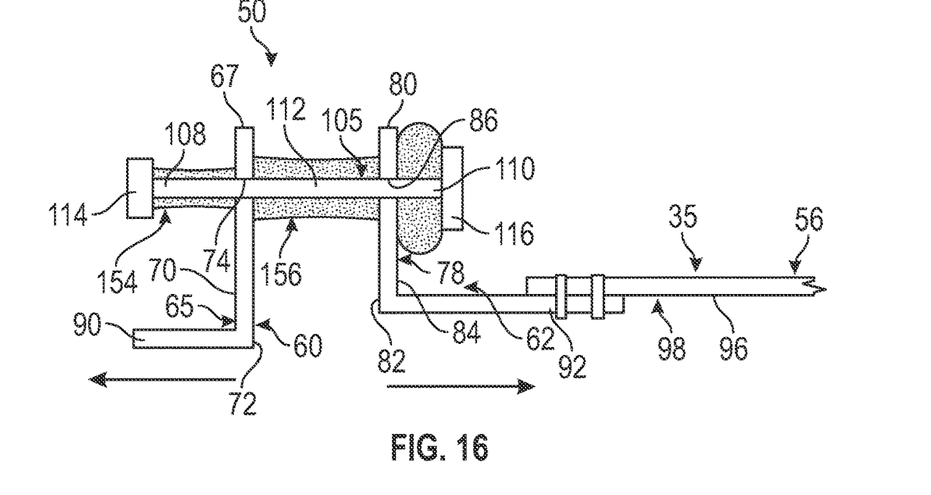
FIG. 16 depicts a partial cross-sectional schematic side view of the coupling of FIG. 14 having compliant components in the form of a resilient elastomeric bushings in tension between first and second flanges, in accordance with another non-limiting example.
Figure 17:
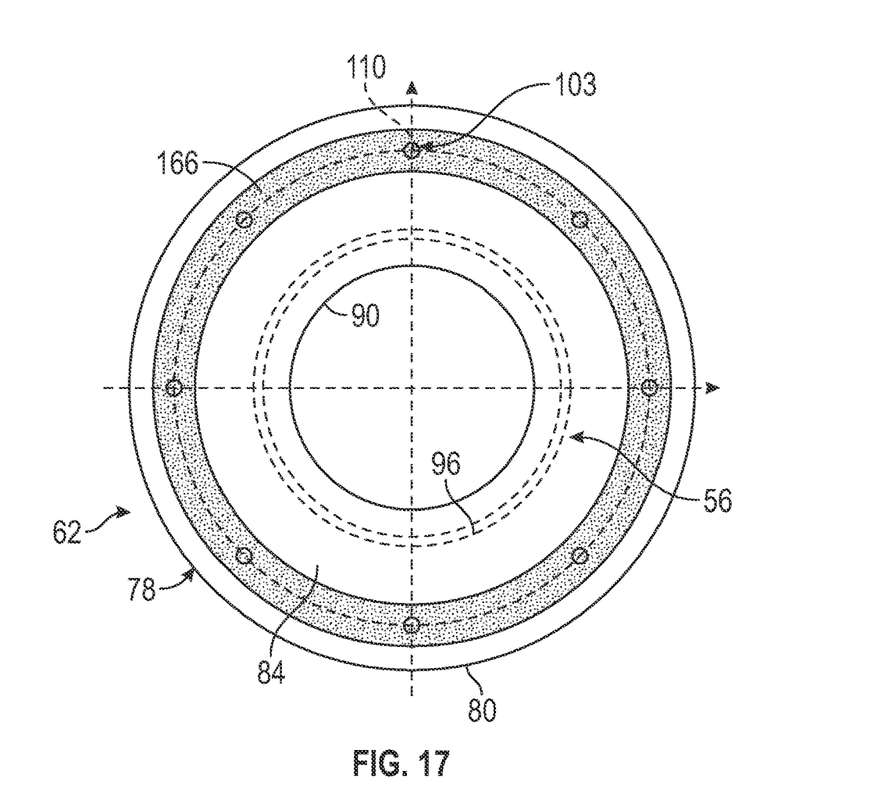
FIG. 17 depicts a diametric cross-sectional schematic side view of the coupling of FIG. 1 having a single, continuous central compliant component in the form of a resilient elastomeric bushing, in accordance with a non-limiting example.

FIG. 14-16 depict compliant components in accordance with another non-limiting example. A first compliant component 154 is disposed between first stop element 114 and first surface 70, a second compliant component 156 is disposed between second surface 72 and first surface section 82, and a third compliant component 158 is disposed between second surface section 84 and second stop element 116. First, second, and third compliant components 154, 156, and 158 take the form of resilient bushings that react in a manner similar to that of springs to compression (FIG. 15) and tension (FIG. 16). The bushing can be made of any suitable elastomeric materials, such as synthetic and natural rubber, polyurethane, and/or different types of low stiffness appropriate polymers. First, second, and third compliant components 154, 156, and 158 may take the form of discrete elements in accordance with one non-limiting example or as shown in FIG. 17, a continuous annular resilient bushing 166 in accordance with another non-limiting example.

Figure 18:
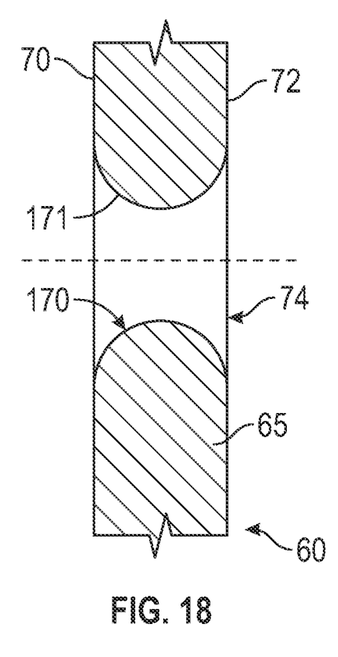
FIG. 18 depicts a partial axial cross-sectional side view of a connector passage in a flange supporting the flexible coupling, in accordance with a non-limiting example.
Figure 19:
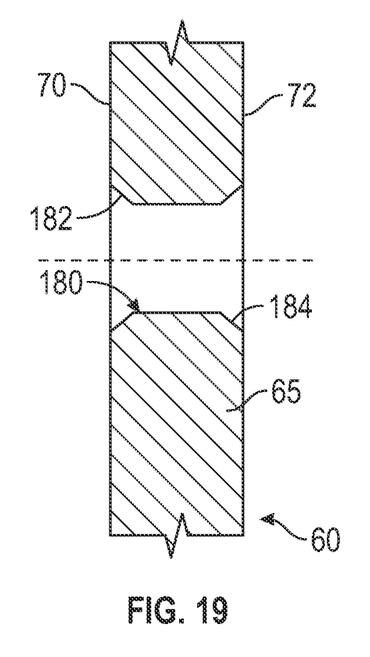
FIG. 19 depicts a partial axial cross-sectional side view of a connector passage in a flange supporting the flexible coupling, in accordance with another non-limiting example.

FIG. 18 depicts opening 74 in first flange 60. It should be understood that second flange 62 may be similarly formed. In a non-limiting example, opening 74 includes an annular wall 170 defined by a curvilinear surface 171 having a constant radius. In a non-limiting example, it should be understood that curvilinear surface 171 may also be formed with a non-uniform radius. In another non-limiting example, surface 171 can include both, at least one, curvilinear segment, either with uniform or non-uniform radius and, at least one, linear segment. Curvilinear surface 171 is designed to accommodate lateral deviates of connecting member 105 so as to minimize any stress concentration zones in first flange 60 and/or in second flange 62. FIG. 19 depicts similar opening 74 having an annular wall 180 including a first taper or chamfer 182 at first side 70 and a second taper or chamfer 184 at second side 72. In a manner similar to that discussed herein, first and second tapers 182 and 184 are designed to accommodate lateral deviates of connecting member 105 so as to minimize any stress concentration zones in flange 60.

In accordance with the non-limiting examples described herein, stiffness properties of compliant components can be designed to meet to specifics of applications and expected service conditions. The stiffness properties are functions of design characteristics of the compliant components, such as, for example, spring type, length, cross-sectional geometry, applied materials, etc. Also, non-limiting examples that employ more than one compliant component per individual connecting element, corresponding stiffness properties may be adjusted between such components, i.e., depending on applications, the compliant components can be the same or different.

At this point, it should be understood that the non-limiting examples described herein present a flexible coupling that links two shafts and accommodates on axis movement (e.g., compression and tension) as well as off-axis movement (e.g., bending). The flexible coupling is easy to manufacture and may be readily configured and reconfigured to accommodate a wide range of operating environments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flexible coupling comprising:
   a first flange, the first flange including a first body having an outer edge, a first surface, a second surface opposite the first surface, and a first plurality of passages that extend through the first body inwardly of the outer edge;
   a second flange, the second flange including a second body having an outer edge section, a first surface section, a second surface section opposite the first surface section, and a second plurality of passages that extend through the second body inwardly of the outer edge;
   a connecting element extending between and connecting the first flange and the second flange through one of the first plurality of passages and one of the second plurality passages, the connecting element including a connecting member having a first end provided with a first stop element, a second end having a second stop element, and an intermediate portion extending between the first end and the second end;
   a first compliant component arranged on the connecting element between the first stop element and the first surface; and
   a second compliant component arranged on the connecting element between one of the second surface and the first surface section and the second stop element and the second surface section;
   wherein the second compliant component is arranged between the second stop element and the second surface section;
   the coupling further comprising: a third compliant component arranged between the second surface and the first surface section, the third compliant component is spaced from the connecting member.

2. The flexible coupling according to claim 1, wherein the first compliant component comprises a spring.

3. The flexible coupling according to claim 1, wherein the first compliant component comprises one of an elastomeric and a polymeric bushing.

4. The flexible coupling according to claim 1, wherein each of the first plurality of passages includes an annular wall having a first taper at the first surface and a second taper at the second surface.

5. The flexible coupling according to claim 1, wherein the second compliant component is arranged on the connecting member between the second surface and the first surface section.

6. The flexible coupling according to claim 1, further comprising: a shaft portion including an outer surface and an inner surface defining a tube, the shaft portion is formed from one of a metal material, a composite material, and a hybrid metal/composite material and connected to the second flange.

7. An aircraft comprising:
a fuselage;
a drive system supported by the fuselage;
a driven system supported by the fuselage; and
a flexible coupling connecting the drive system and the driven system, the flexible coupling comprising:
a first flange operatively connected to the drive system, the first flange including a first body having an outer edge, a first surface, a second surface opposite the first surface, and a first plurality of passages that extend through the first body inwardly of the outer edge;
a second flange operatively connected to the driven system, the second flange including a second body having an outer edge section, a first surface section, a second surface section opposite the first surface section, and a second plurality of passages that extend through the second body inwardly of the outer edge;
a connecting element extending between and connecting the first flange and the second flange through one of the first plurality of passages and one of the second plurality passages, the connecting element including a connecting member having a first end provided with a first stop element, a second end having a second stop element, and an intermediate portion extending between the first end and the second end; and a first compliant component arranged on the connecting member between the first stop element and the first surface; and
a second compliant component arranged on the connecting member between one of the second surface and the first surface section and the second stop element and the second surface section;
wherein the second compliant component is arranged between the second stop element and the second surface section;
the flexible coupling connecting further comprising:
a third compliant component arranged between the second surface and the first surface section, the third compliant component is spaced from the connecting member.

8. The aircraft according to claim 7, wherein the first compliant component comprises a spring.

9. The aircraft according to claim 7, wherein the first compliant component comprises one of an elastomeric and a polymeric bushing.

10. The aircraft according to claim 7, wherein each of the first plurality of passages includes an annular wall including a first taper at the first surface and a second taper at the second surface.

11. The aircraft according to claim 7, wherein the second compliant component is arranged one the connecting member between the second surface and the first surface section.

12. The aircraft according to claim 7, further comprising: a shaft portion including an outer surface and an inner surface defining a tube, the shaft portion is formed from one of a metal material, a composite material, and hybrid metal/composite material and connected to the second flange.

* * * * *